United States Patent [19]

Taomo

[11] Patent Number: 5,368,107
[45] Date of Patent: Nov. 29, 1994

[54] VIBRATION PREVENTIVE COIL SPRING MOUNTING STRUCTURE

[75] Inventor: Toshio Taomo, Nishitama, Japan

[73] Assignee: Kioritz Corporation, Ohme

[21] Appl. No.: 135,629

[22] Filed: Oct. 14, 1993

[30] Foreign Application Priority Data

Oct. 14, 1992 [JP] Japan .................... 4-71694[U]

[51] Int. Cl.⁵ .................... B25D 17/24; F16F 1/38
[52] U.S. Cl. .................... 173/162.2; 30/381; 267/33; 267/179
[58] Field of Search .................... 173/162.1, 162.2; 30/381, 382, 383, 384, 385; 267/33, 179, 137

[56] References Cited

U.S. PATENT DOCUMENTS

| | | | |
|---|---|---|---|
| 199,945 | 2/1878 | Vose | 267/33 |
| 1,716,431 | 6/1929 | Delgado | 267/179 |
| 1,832,184 | 11/1931 | Christen | 267/33 |
| 2,252,789 | 8/1941 | Van Dorn | 267/33 |
| 3,140,746 | 7/1964 | La Force . | |
| 3,525,373 | 8/1970 | Kobayashi . | |
| 3,542,095 | 11/1970 | Frederickson et al. . | |
| 4,011,397 | 3/1977 | Bouche | 267/179 |
| 4,141,143 | 2/1979 | Hirschkoff et al. | 30/381 |
| 4,334,357 | 6/1982 | Baricevic | 30/381 |
| 5,046,566 | 9/1991 | Dorner et al. . | |

Primary Examiner—Scott A. Smith
Attorney, Agent, or Firm—Cushman, Darby & Cushman

[57] ABSTRACT

In a portable work machine, such as a chain saw, a vibration preventive coil spring mounting structure is provided which, upon interposition of a vibration preventive coil spring between a main body having a power source and a covering part having handles and adapted to support the main body, can ensure stable, secure and easy fixing of the coil spring to spring mount seats and which is advantageous from the standpoint of cost. Structurally, of a vibration preventive coil spring (10) is interposed between a main body (2) including a power source and a covering part (3) including grip handles (4, 5) and arranged to partially surround the outer periphery of the main body (2) to support same. Opposite ends (LO a, lob) of the coil spring (10) contact spring mount seats (11, 6a) of the main body (2) and the covering part (3), respectively, and cylindrical resilient fixing members (20, 20) are inserted at the opposite ends (10a, 10b) of the coil spring and abut against inner peripheries thereof. Nut members (25, 25) are inserted into inner end portions of the resilient fixing members (20, 20) into which bolts (40, 40) are inserted respectively from sides of the spring mount seats (11, 6a) at opposite ends of the coil spring (10). The bolts are tightened to compress the resilient fixing members (20, 20) in the axial direction and swell the fixing member in a radial direction and thereby fix opposite ends (10a, 10b) of the coil spring (10) to the spring mount seats (11, 6a).

4 Claims, 3 Drawing Sheets

VIBRATION PREVENTIVE COIL SPRING MOUNTING STRUCTURE

BACKGROUND OF THE INVENTION

1. Field of the Invention

The present invention relates to a vibration preventive coil spring mounting structure in a portable work machine, such as a chain saw, and, more particularly, to the easy mounting of the opposite ends of a vibration preventive coil spring to spring mount seats without need of troublesome works, such as welding.

2. Description of the Prior Art

A portable work machine, such as a chain saw, essentially comprises a main body including a power source, and a covering part including grip handles and arranged to surround or partially surround the outer periphery of the main body so as to support same. To suppress propagation of vibrations generated by the power source and impacts generated from the work part (saw chain and other portable power machines) to the grip handles, a plurality of vibration preventive resilient members each having a cylindrical form and made of rubber, for example, are usually interposed between the main body and the covering part so that the main body may substantially be suspended from the covering part through the vibration preventive resilient members (see Japanese Utility Model Publication No. 63-21362).

Generally, the vibration preventive resilient members are made of rubber and are interposed between the main body and the covering part. Also, at least one end of the vibration preventive resilient member is typically bonded and jointed with a fitting end metal plate to which a connecting screw member is secured.

However, the vibration preventive resilient member is adapted to connect the vibration generating source (power Source) and the stationary part (grip handles) and, therefore, there is a good possibility that the bonded portion of the fitting end metal plate will separate from the vibration preventive resilient member due to vibrations generated by the power source. Accordingly, bonding and jointing the vibration preventive resilient member and the end metal plate must be carried out with the greatest care. However, even when the bonding and jointing is done with great care, it is not infrequent that the bonded jointing portion is separated depending on the use or ambience of the work machine. In the event that one of the bonded jointing portions is separated, load acting on the bonded jointing portions of the other vibration preventive resilient members increases to make these bonded jointing portions liable to separate. Thus, eventually there arises the danger that all or almost all of the bonded jointing portions are separated and the main body separates from the covering part including the grip handles.

Under the circumstances, it is conceivable that a vibration preventive coil spring could be substituted for the vibration preventive resilient members of rubber interposed between the main body and the covering part. The use of the coil spring, however, presents a problem of how to fix the spring.

More particularly, in order to fix the coil spring to mounted parts (spring mount seats), generally, some expedients are required in which metal fittings are mounted to the opposite ends of the coil spring and jointed to the spring mount seats with screws or by welding. In another expedient, insert members made of metal or plastic are fitted in the opposite ends of the coil spring to abut against the inner periphery thereof and are fixed to the mounted parts by welding, bonding or bolting. In the above expedients, however, the assembled state between the coil spring and the metal fitting or insert member mounted thereto is unstable, resulting in possible separation of the metal fitting or insert member and in addition, considerable labor and time are required to mount the metal fittings or insert members to the mounted parts, leading to an increase in cost.

It is, therefore, an object of the present invention to provide, in a portable work machine, such as a chain saw, a vibration preventive coil spring mounting structure which, upon interposition of a vibration preventive coil spring between a main body including a power source and a covering part including grip handles and adapted to support the main body, can ensure stable, secure and easy fixing of the coil spring to spring mount seats and which is advantageous from the standpoint of reduced cost.

To accomplish the above and other objects of the invention, in a portable work machine such as a chain saw, a vibration preventive coil spring mounting structure is interposed between a main body including a power source and a covering part including grip handles and arranged to partially surround the outer periphery of the main body and support same, opposite ends of the coil spring contact spring mount seats of the main body and the covering part, respectively, cylindrical resilient fixing members are inserted into opposite ends of the coil spring and abut against inner peripheries thereof, and nut members adapted to fit into a recess at the inner end portions of the resilient fixing members. Bolts are connected to the spring mount seats and extend into opposite ends to the coil spring and threadably engaged with the nut members and tightened to compress the resilient fixing members in the axial direction and swell the fixing members in the radial direction to thereby fix the opposite ends of the coil spring to the spring mount seats.

The vibration preventive coil spring mounting structure according to the present invention constructed as above can be assembled through the procedure exemplified below.

More particularly, (i) for a single coil spring, two cylindrical resilient fixing members are prepared, each having one end to which a nut member is mounted beforehand by a suitable means such as bonding or embedding so as to prevent rotation. (ii) The resilient fixing members with nut members are inserted, headed by their side mounted with the nut member, into the opposite ends of the coil spring. (iii) The coil spring having opposite ends to which the fixing resilient members with nut members are inserted is interposed between the spring mount seats of the main body and covering part of the work machine so that the opposite ends of the coil spring contact the respective spring mount seats. (iv) The bolts (threaded) are inserted from sides of the spring mount seats opposite to the coil spring so as to be screwed into the threaded nut members and tightened.

By tightening the bolts, the nut members which are prevented from rotating are moved in the axial direction so as to approach the spring mount seats. The resilient fixing members are compressed by the axial movement of the nut members which causes the outer peripheries of the resilient members to swell in the radial direction and the swelled outer peripheral portions of the resilient members intrude into inner inter-thread gaps of the coil spring.

According to the invention, the coil spring is fixed to the spring mount seats through the medium of the resilient fixing members with nut members and the bolts.

Accordingly, the opposite ends of the coil spring are held securely by the resilient members fixing which in turn are held by the nut members and the bolts, thus ensuring that the coil spring can be prevented from departing from the spring mount seats even when subjected to very strong vibrations.

This is due to the the resilient fixing members being fitted in the opposite ends of the coil spring in a screw fashion and taking advantage of the resiliency of the fixing members to absorb the contractile movement of the coil spring.

In this manner, the coil spring can be fixed to the spring mount seats stably, securely and readily without need of troublesome work, such as welding. Also, the invention offers the advantage of cost reduction.

In addition, the vibration preventive effect due to the resilient fixing members in addition to the coil spring, can be expected, since the resilient fixing members inserted in the opposite ends of the coil spring act as a vibration preventive member.

DESCRIPTION OF THE PREFERRED EMBODIMENTS

An embodiment of the present invention will now be described in detail with reference to the accompanying drawings.

Figure 1:
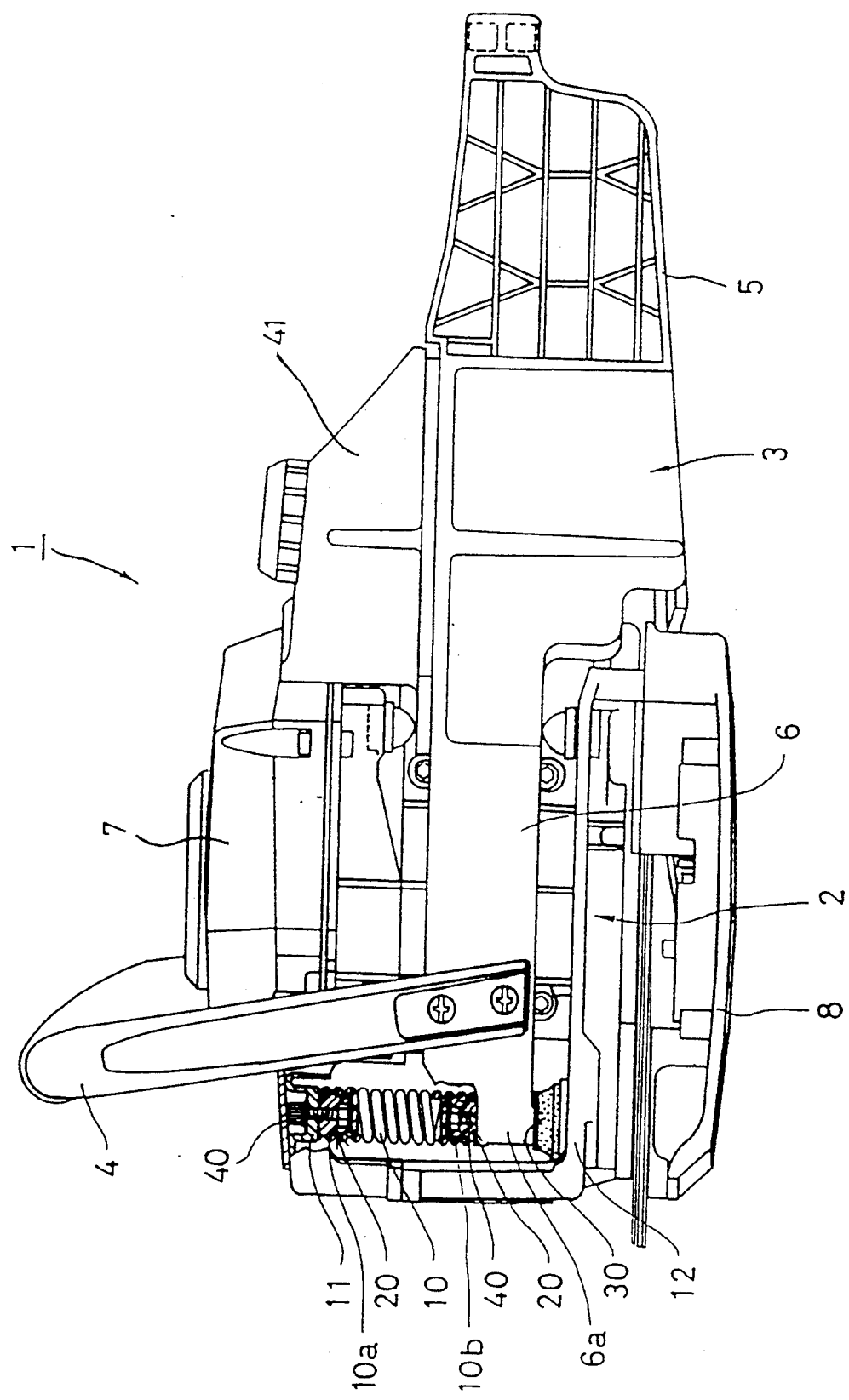
FIG. 1 is a bottom view, partly cut away, of a chain saw in which a vibration preventive coil spring mounting structure according to the present invention is applied.

FIG. 1 shows, as viewed from the bottom and partly cut away, a chain saw as an example of a work machine to which an embodiment of vibration preventive coil spring mounting structure according to the present invention is applied.

Referring to FIG. 1, the chain saw generally designated at 1 comprises a main body 2 including a power source, and a covering part 3 arranged to partially surround the outer periphery of the main body 2 so as to support the main body. Although not shown, an air-cooled two-cycle gasoline engine serving as the power source is mounted in the main body 2 and a saw chain driven by the engine and a guide bar for the saw chain are arranged on the right fore portion (left bottom portion as viewed in FIG. 1) of the main body 2 so as to protrude frontally.

The covering part 3 includes a frame 6 mounted with a front handle 4 and a rear handle 5, and the main body 2 is comprised of a recoil starter 7 and a saw chain guide bar fixture 8, which is arranged on both sides of the engine, and a fuel tank 41. For interconnection of the main body 2 and the covering part 3, a conventional vibration preventive resilient member of, for example, rubber (not shown) is employed as well as a vibration preventive coil spring mounting structure as exemplified according to the present embodiment is applied to a fore end side lower portion, which is considered to be the most important portion and which has a mounting span that is too long to be covered by the conventional vibration preventive resilient member.

The overall construction of the chain saw 1 as above and components thereof except those featuring the present invention described below are well known and will not be described herein in detail (if necessary, see Japanese Utility Model Publication No. 63-21362).

Referring to the vibration preventive coil spring mounting structure according to the present embodiment, a covering part side spring mount seat 6a is provided at a fore end side lower portion of the covering part 3, a main body side spring mount seat 11 is provided at a fore end side lower portion of the main body 2 having the engine as principal member, and a vibration preventive coil spring 10 is securely interposed between the two spring mount seats 6a and 11.

Figure 2:
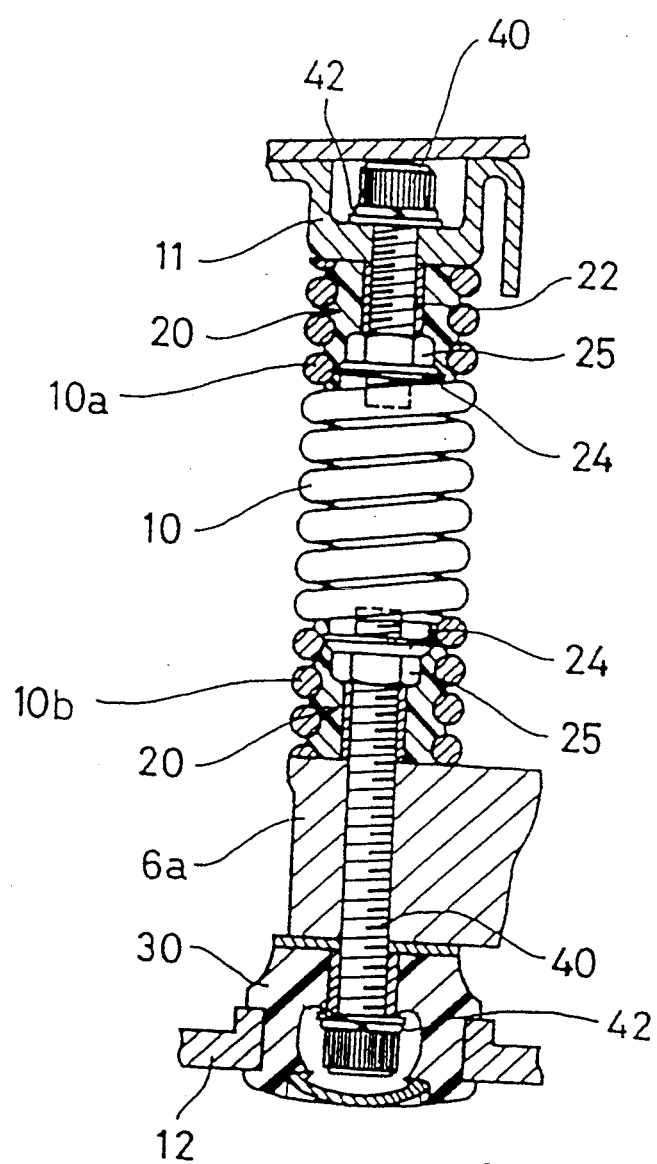
FIG. 2 is an enlarged sectional view showing details of a vibration preventive coil spring shown in FIG. 1.

More particularly, as detailed in FIG. 2, the coil spring 10 formed of a spring steel wire has one end contacting the covering part side spring mount seat 6a and the other or opposite end contacting the main body side spring mount seat 11. Resilient fixing members 20, 20 are slightly press-fitted into opposite ends of the coil spring 10 to abut against the inner periphery thereof.

Figure 3:
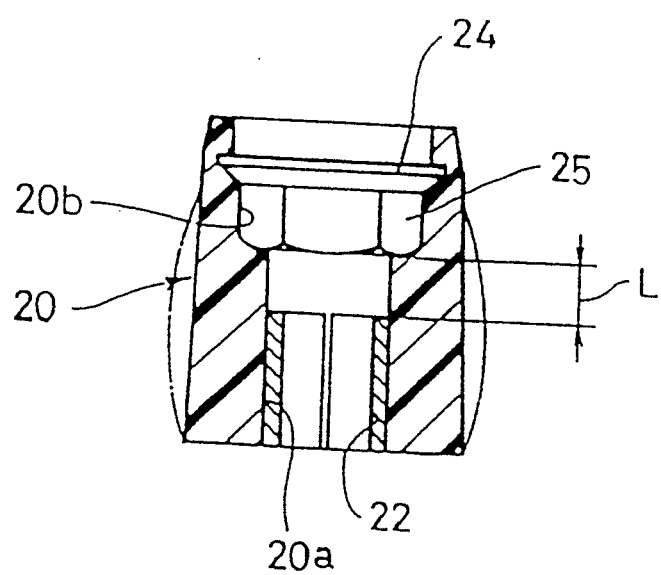
FIG. 3 is an enlarged, longitudinal sectional view showing a free state of a fixing resilient member shown in FIGS. 1 and 2.

The resilient fixing member 20 is made of a resilient material such as rubber and as shown in FIG. 3 in the free state, has a cylindrical form having a stepped inner surface wall constructed of inner surface walls 20a and 20b. The inner surface wall 20a, which is outward as viewed in the direction of insertion of the coil spring 10 (the downward direction as viewed in FIG. 3), has a circular cross-section. A coiled bush 22 formed of a thin steel plate is inserted and abuts against the inner peripheral lower half of the outward inner surface wall 20a. The inner surface wall 20b, which is inward as viewed in the insertion direction, preferably has a hexagonal cross-section of a larger inner diameter than that of the inner surface wall 20a. A hexagonal or other shaped nut 25 with flange 24 is fitted into and abuts against the periphery of the inner surface wall 20b so as to prevent rotating of the nut. When the resilient fixing member 20 is in its free state, the inward end of the coiled bush 22 is spaced apart by a constant distance L from the outward end of the hexagonal nut 25. The resilient fixing member 20 may be molded integrally with the hexagonal nut 25 during the formation of the resilient fixing member.

The resilient fixing members 20 of the above construction are press-fitted, headed by their side mounted with the hexagonal nut 25, in the opposite ends LO a and lob of the coil spring 10 under suitable pressing force, and bolts 40 are screwed, with intervention of a washer 42, into the hexagonal nuts 25 mounted to the resilient fixing members 20 from the sides of the spring mount seats 11 and 6a which are at opposite ends of the coil spring 10. The hexagonal nuts 25 with flanges 24 are pulled outwards to compress the resilient fixing members 20, 20 in the axial direction and swell the fixing members in the radial direction as shown at chained line in FIG. 3, thereby fixing the opposite ends LO a and lob of the coil spring 10 rigidly to the spring mount seats 11 and 6a.

The vibration preventive coil spring mounting structure of the present embodiment constructed as above can be assembled by the procedure exemplified below.

(i) The resilient fixing member 20 can be molded beforehand integrally with the hexagonal nut 25 and with flange 24 which abuts against the inner periphery of the inward inner surface wall 20b so as to prevent the nut from rotating when threadably engaged with the bolt.

(ii) The resilient fixing members 20 mounted with the hexagonal nuts 25 and with flanges 24 are press-fitted, headed by their side mounted with the hexagonal nut 25, in the opposite ends LO a and lob of the coil spring 10.

(iii) The coil spring 10 to which the resilient fixing members 20,0 20 are inserted is interposed between the spring mount seats 11 and 6a of the main body 2 and the covering part 3, with one end of the coil spring contacting the main body side spring mount seat 11 and the other end of the coil spring contacting the covering part side spring mount seat 6a.

(iv) The bolts 40, 40 are screwed into the hexagonal nuts 25 from the sides of the spring mount seats 11 and 6a which are at opposite ends of the coil spring 10 so as to tighten the hexagonal nuts 25. In the case of the illustrated example, the bolt 40 screwed in from the side of the covering part spring mount seat 6a opposite to the coil spring 10 is longer than the bolt 40 screwed in from the side of the main body side spring mount seat 11 at the opposite end of the coil spring 10. The longer bolt is screwed into the hexagonal nut 25 after being passed through a conventional vibration preventive resilient member 30 made of rubber and disposed in a receiving gap extending a short distance from another main body side mount seat 12 facing the side of the covering part side spring mount seat 6a which is at the opposite end of the coil spring 10.

By tightening the bolts 40, 40, the hexagonal nuts 25 with flanges 24, which are prevented from rotating, are moved in the axial direction to approach the mount seats 11 and 6a. The axially outward movement of the hexagonal nuts 25 reduces the spacing distance L between the hexagonal nut 25 and the coiled bush 22, so that the resilient fixing members 20, 20 are compressed so that the outer peripheries are expanded radially as shown at chained line in FIG. 3 and the swelled outer peripheral portions intrude and are forced into interthread gaps of the coil spring 10 as best seen in FIG. 2.

In this manner, the coil spring 10 is rigidly fixed to the mount seats 11 and 6a through the medium of the resilient fixing members 20, 20 mounted with the hexagonal nuts 25 and the bolts 40, 40.

In this case, the resilient fixing members 20 and 20 are fitted in the opposite ends of the coil spring 10 in a screw fashion and the resilient fixing members 20 and 20 and due to the resiliency of the fixing members absorb the contractile movement of the coil spring 10. The opposite ends of the coil spring 10 can be held securely by the resilient fixing members 20 and 20 which in turn are held by the hexagonal nuts 25 and bolts 40, thus ensuring that the coil spring 10 can be prevented from leaving from the spring mount seats 11 and 6a even when subjected to very strong vibrations.

With the above construction, the coil spring 10 can be held in the relatively long gap between the spring mount seats 11 and 6a stably, securely and readily without need of troublesome work, such as welding, and, at the same time, has the advantage of cost reduction.

Since the resilient fixing members 20 and 20 inserted in the opposite ends of the coil spring 10 act as vibration preventive members, the vibration preventive effect due to the resilient fixing members 20 and 20, added to that due to the coil spring 10, can be expected.

In addition, in the present embodiment, the conventional vibration preventive member 30 which is made of, for example, rubber can also be tightened by one bolt 40 for fixing the coil spring 10 and vibration preventive resilient member 30 which permits parts to be used in common and at the same time, the vibration preventive resilient member 30 can be held securely and stably.

In view of the foregoing, the vibration preventive coil spring mounting structure of the present invention as applied to a specified site of the chain saw is exemplified, but the present invention is not limited thereto and can be applied to other sites of the chain saw and other portable work machines than the chain saw.

As will be understood from the foregoing description, the vibration preventive coil spring mounting structure of the present invention, provides beneficial effects including a stable vibration preventive coil spring fixed securely between the main body the power source and the covering part, grip handles, for supporting the main body, and, at the same time having the advantage of reduced cost.

What is claimed is:

1. A mounting structure of a vibration preventive coil spring (10) for use in a portable work machine (1), said vibration preventive coil spring being interposed between a main body (2) including a power source and a covering part (3) including grip handles (4, 5) and arranged to partially surround the outer periphery and support said main body, wherein opposite ends (10a, 10b) of said coil spring (10) contact spring mount seat (11) of said main body (2) and spring mount seat (6a) of said covering part (3), cylindrical resilient fixing members (20,20) extending part way into said opposite ends (10a, 10b) and press-fitted within said opposite ends to abut against inner peripheries of the coil spring (20), nut members (25, 25) adapted to fit into a recess at the inner end portions of said resilient fixing members (20, 20), bolts (40, 40) connected to said spring mount seats (11, 6a) and extending into opposite ends of said coil spring (10) and threadably engaged with said nut members (25, 25) and tightened to compress said resilient fixing members (20, 20) in an axial direction and swell said resilient fixing members (20, 20) in a radial direction to thereby fix said opposite ends (10a, 10b) of said coil spring (10) to said spring mount seats (11, 6a).

2. A mounting structure according to claim 1 wherein an inner surface wall (20b) of the recess at the inner end portions of said resilient fixing members (20, 20) has a hexagonal cross-section of a larger inner diameter than that of said inner surface wall (20a), and a hexagonal nut (25) with flange (24) is fitted in and fixed to abut against the periphery of said inner surface wall (20b) to prevent rotation.

3. A mounting structure according to claim 1 wherein said resilient fixing member (20) is molded integrally with said nut member (25) during formation of said resilient fixing member (20).

4. A spring mounting structure comprising, in combination,
(a) a coil spring of definite length interposed between and in contact with mounting seats at opposite ends of said coil spring,
(b) a cylindrical resilient fixing member extending part way into each end of said coil spring and press-fitted within said each end of said coil spring so as to contact inner surfaces of said coil spring, (c) threaded nut members imbedded into a recess in an inner end portion of each of said resilient fixing members,
(d) threaded bolts extending through said mounting seats, said resilient fixing member and threadably engaged with said threaded nut members to tighten sufficiently to compress said resilient fixing members in an axial and radial direction and thereby fix said coil spring to said mounting seats.

* * * * *

REEXAMINATION CERTIFICATE (3338th)

United States Patent [19]
Taomo

[11] B1 5,368,107
[45] Certificate Issued Sep. 23, 1997

[54] VIBRATION PREVENTIVE COIL SPRING MOUNTING STRUCTURE

[75] Inventor: Toshio Taomo, Nishitama, Japan

[73] Assignee: Kioritz Corporation, Ohme, Japan

Reexamination Request:
No. 90/004,420, Oct. 22, 1996

Reexamination Certificate for:
Patent No.: 5,368,107
Issued: Nov. 29, 1994
Appl. No.: 135,629
Filed: Oct. 14, 1993

[30] Foreign Application Priority Data

Oct. 14, 1992 [JP] Japan ................. 4-71694 U

[51] Int. Cl.$^6$ .................. B25D 17/24; F16F 1/38
[52] U.S. Cl. .................. 173/162.2; 30/381; 267/33; 267/179
[58] Field of Search ................ 173/162.2, 162.1; 30/381, 382, 383, 384, 385; 267/33, 179, 137

[56] References Cited

U.S. PATENT DOCUMENTS 1,644,783  10/1927  Lissel ........................... 267/286

FOREIGN PATENT DOCUMENTS 0264276  4/1988  European Pat. Off. .
1251095  6/1961  Germany .

Primary Examiner—Scott A. Smith

[57] ABSTRACT

In a portable work machine, such as a chain saw, a vibration preventive coil spring mounting structure is provided which, upon interposition of a vibration preventive coil spring between a main body having a power source and a covering part having handles and adapted to support the main body, can ensure stable, secure and easy fixing of the coil spring to spring mount seats and which is advantageous from the standpoint of cost. Structurally, of a vibration preventive coil spring (10) is interposed between a main body (2) including a power source and a covering part (3) including grip handles (4, 5) and arranged to partially surround the outer periphery of the main body (2) to support same. Opposite ends (LO a, lob) of the coil spring (10) contact spring mount seats (11, 6a) of the main body (2) and the covering part (3), respectively, and cylindrical resilient fixing members (20, 20) are inserted at the opposite ends (10a, 10b) of the coil spring and abut against inner peripheries thereof. Nut members (25, 25) are inserted into inner end portions of the resilient fixing members (20, 20) into which bolts (40, 40) are inserted respectively from sides of the spring mount seats (11, 6a) at opposite ends of the coil spring (10). The bolts are tightened to compress the resilient fixing members (20, 20) in the axial direction and swell the fixing member in a radial direction and thereby fix opposite ends (10a, 10b) of the coil spring (10) to the spring mount seats (11, 6a).

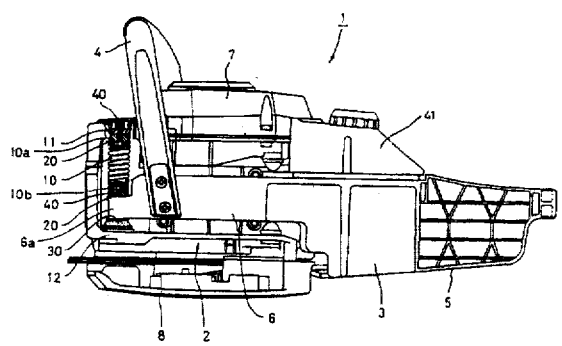

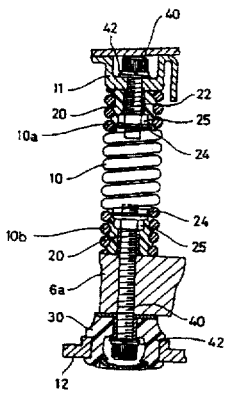

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1, 3 and 4 is confirmed.

Claim 2 is determined to be patentable as amended.

New claims 5, 6, 7 and 8 are added and determined to be patentable.

2. A mounting structure according to claim 1 wherein an inner surface wall (20b) of the recess at the inner end portions of said resilient fixing members (20, 20) has a hexagonal cross-section of a larger inner diameter than that of [said] *an* inner surface wall (20a) *at the outer end portions*, and a hexagonal nut (25) with flange (24) is fitted in and fixed to abut against the periphery of said inner surface wall (20b) to prevent rotation.

*5. A mounting structure according to claim 1 further including a bushing mounted within said resilient fixing member about said bolt to limit the axial movement of said nut member and support the interior of said resilient fixing member.*

*6. A mounting structure according to claim 1 further including an internal support provided within said resilient fixing members and outwardly of said nut members.*

*7. A mounting structure according to claim 6 wherein said internal support comprises a tubular member.*

*8. A mounting structure as in claim 1 wherein the compression on said cylindrical resilient fixing member creates radial swelling over substantially the whole length thereof.*

* * * * *